June 8, 1943. J. WINTHROP Re. 22,334

VACUUM CLEANER

Original Filed Nov. 22, 1940

INVENTOR,
John Winthrop.
BY
John W. Howard.
ATTORNEY.

Reissued June 8, 1943

Re. 22,334

UNITED STATES PATENT OFFICE 22,334

VACUUM CLEANER

John Winthrop, Wyckoff, N. J.

Original No. 2,304,868, dated December 15, 1942, Serial No. 366,673, November 22, 1940. Application for reissue December 18, 1942, Serial No. 469,464

4 Claims. (Cl. 261—121)

This invention relates to vacuum cleaners of the class having a fabric bag or other foraminous refuse collector covering the discharge end of the main air passage of the cleaner.

The object is to provide the cleaner with means to supply atomized liquid to said passage and thereby charge the air therein and hence the collector and its contents with such atomized liquid. The liquid may and desirably will be of a character to act as a deodorizer, disinfectant, or the like.

In order to effect atomizing of the liquid the invention contemplates presence of a liquid container, means to conduct air to the container below the liquid level and having its intake out of catching relation to air flowing through said passage, and means to conduct fluid from the container at a point above said level and to said passage. Thereby refuse of a certain class carried along with the air flowing through said passage will be excluded from the system and particularly from the container, whereby to prevent arrest of the ebullition and hence the atomizing of the liquid and also possible clogging of the system.

Figure 1:
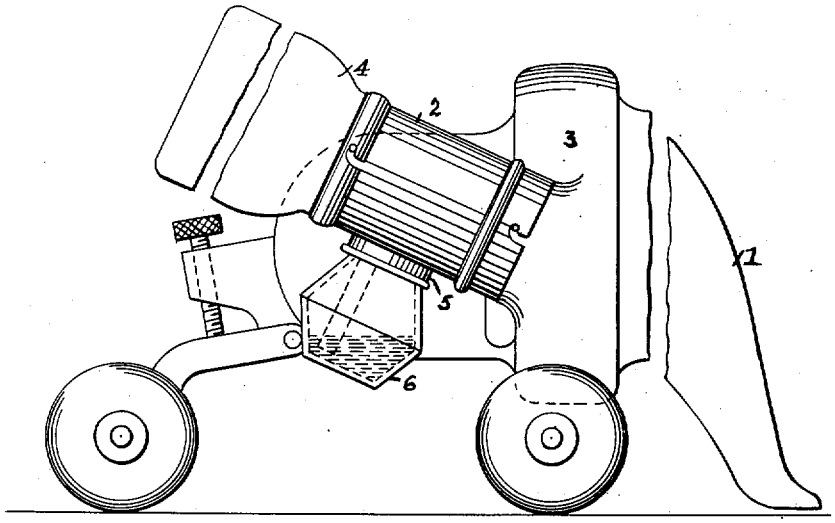
Fig. 1 is a side elevation of a vacuum cleaner embodying the invention.
Figure 2:
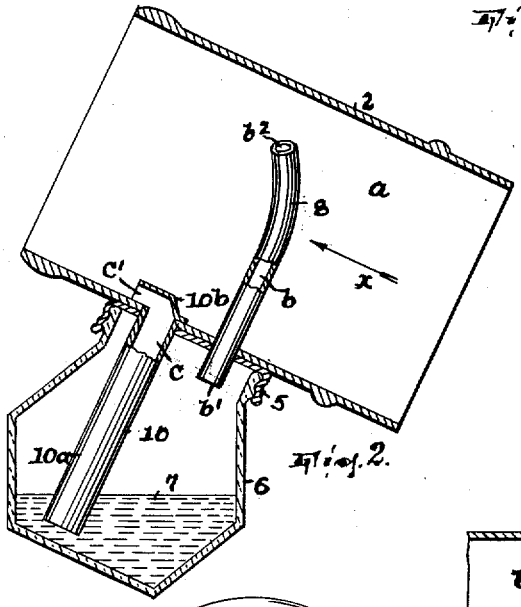
Fig. 2 is a view of its nozzle 2 and said system partly in longitudinal section and partly in elevation.

The intake nozzle 1, cylinder 2 forming a discharge nozzle and intervening fan or blower housing 3 of a standard type of vacuum cleaner provide the main passage *a* for refuse-carrying air impelled generally as per the arrow *x* by the fan or blower (not shown) in said housing. This passage, as usual, will be covered at its left-hand or discharge end by a foraminous refuse collector 4, as a fabric bag, which will hold the refuse while allowing the air to escape through its interstices.

The cleaner includes a liquid container here formed by a cap 5 existing in fixed relation to nozzle 2 and a bottle 6 preferably transparent and detachably attached to the cap, as by the rim of the cap having an indented portion 5*a* to engage a screw-thread on the bottle-mouth.

Figure 3:
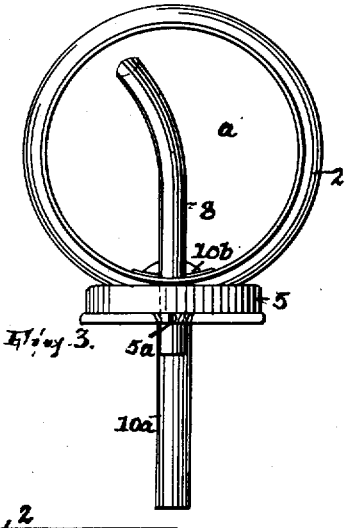
Fig. 3 is a right-hand end elevation of said nozzle and system with the container removed.
Figure 4:
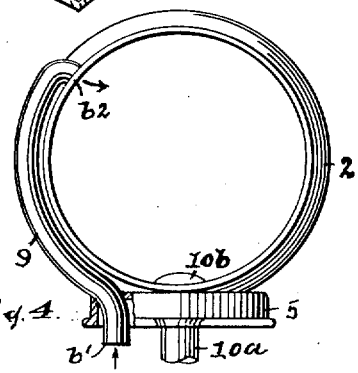
Fig. 4 is a similar view of a modification.

The cleaner provides a fluid-conducting passage *b* having an intake at *b'* open to the interior of the container above the level of the treating liquid 7 placed therein and an outlet $b^2$ open to passage *a*. This passage may be formed by a tube 8 penetrating and fixed in the cap and the wall of nozzle 2 and projecting up into the passage, or by a tube 9 (Fig. 4) penetrating such cap and wall but arranged wholly exterior of the nozzle. The outlet $b^2$ is positioned in any case out of catching relation to the air impelled by the fan through passage *a*, by which I mean that it may face as in Fig. 4 at right angles to the path of flow of such air past it or, as in Fig. 3, more or less in the direction of such flow. Relatively to a certain intake *c'* to be referred to it is also located where the velocity of the air impelled through passage *a* by the fan is the greater, and preferably where the velocity of such air is the maximum. The form shown by Fig. 4 has the advantage that the tube 9 provides no obstacle on which the air-carried refuse might collect to form a mass between the end of the tube (as 8) and the wall of the nozzle which may grow so as eventually to obstruct the outlet.

A passage *c* to conduct air from passage *a* to the interior of the container at a point below the liquid level therein is here afforded by a tube 10 comprising a tube proper 10*a* penetrating the wall formed by nozzle 2 and the cap and a hood 10*b* preferably covering the upper end of the tube proper and having its open side facing in the direction of arrow *x*, the tube proper depending into the liquid. The intake *c'* of this passage is located where the velocity of the air impelled through passage *a* is lower than at the point where outlet $b^2$ is located—or here at the lower side of passage *a* where such velocity is least.

Of course when air is impelled by the blower through passage *a* with the collector in covering relation to the discharge end of the passage pressure is built up therein which would otherwise be of the same degree throughout the passage and the collector space, that is to say, of the same degree at the outlet $b^2$ and intake *c'*, except that the difference in the velocities of the thus impelled air at these two points has to be taken into account. As indicated, the velocity at the outlet $b^2$ is greater than at the intake, wherefore the pressure at the intake is actually greater than that at the outlet; therefore there is flow of air via passage *c*, the container and passage *b* in the order named, resulting in ebullition of the liquid in the container, with atomizing thereof, the liquid in atomized form being conveyed by the air escaping via passage *b* to passage *a* to charge the air impelled through the latter passage and thereby be conveyed to the collector and its contents.

Now, while my invention provides for treating the collector and its contents with an atomized liquid it also has this further advantage: In the operation of any vacuum cleaner lint and other light or buoyant particles in very considerable quantity pass with the impelled air into the bag or other collector, especially since the cleaner's primary duty is the cleaning of carpets, rugs and other fabric materials. In my efforts to equip the cleaner with means to convey a treating fluid to the collector and its contents I found that when there was resort to a container whose contained liquid was to undergo ebullition and thereby atomizing it was necessary in some way to prevent such light or buoyant particles being driven into the container, since otherwise they so quickly collected in the liquid in a mass which terminated the ebullition, to say nothing of the likelihood of clogging the system, that renewal of the liquid was necessary in some instances during a single use of the cleaner. According to my invention herein disclosed, that is to say, in any form thereof, access of such light particles is substantially nil. This I account for as follows:

Such light particles cannot of course enter the outlet $b^2$ because the flow through passage *b* is toward the outlet. As for intake *c'*, while there is fluid flow into passage *c* via the intake its velocity is little compared to that of the air impelled through passage *a* by the fan, wherefore particles carried along by the impelled air in passage *a* are driven past the intake, the superior force of the impelled air and their own inertia representing a force greater than that of the current flowing to the intake.

Figure 5:
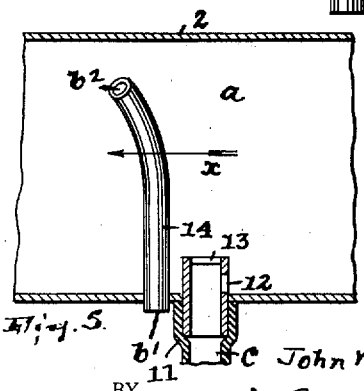
Fig. 5 is a fragmentary longitudinal sectional view, with the container removed, of another modified form of the part of the cleaner including said nozzle and system.

This theory is justified by the form shown in Fig. 5. Here the tube 11 affording the passage *c* upstands into passage *a* and may be said to have its intake corresponding to *c'* here nearly coincident with the plane of the inner bottom surface of nozzle 2. There is a port 12 facing in catching relation to the air impelled by the fan through passage *a* (or here directly contra to arrow *x*) and a port 13 at the top of the tube having preferably at least the same area as port 12. 14 is a tube affording the passage *b*; it is assumed to depend short of and tube 11 to reach into the liquid in the container. If port 13 be closed or omitted the mentioned light particles will in a matter of a quite short time so come to charge the liquid that the container contents have to be removed and fresh or clear liquid substituted. With port 13 active and port 12 closed the system operates without charging the container with said particles practically indefinitely, although it is in this case true that more particles enter the container than in the forms first described. Here, again, the preponderant force of the fan-impelled air, plus the inertia of the particles, therefore appears to prevent the latter from responding to the lesser force of the flow into and through passage *c*. The impelled air and particles, on entering port 12, obviously at once return via port 13 to passage *a*, so that the effect is as if the part of the tube above the above-indicated plane were removed, leaving intake *c'* open directly to passage *a*. Hence it follows that, flow according to my invention being caused to take place through passage *c*, the container and passage *b*, in the order named (because the velocity in passage *a* at $b^2$ exceeds that at *c'*), the intake should be faced in the way generally characterizing outlet $b^2$, or out of opposition to, and preferably more or less in, the direction of flow through passage *a*, and so not in catching relation to the air impelled by the fan through passage *a*.

It is to be considered that the invention broadly contemplates that the cleaner shall include a liquid container, a fluid-conducting means, here afforded by passage *b*, having an intake open to the interior of the container above the liquid level therein and an outlet open to the main passage of the cleaner and positioned to be subject to suction induced by flow of air impelled through said passage toward its discharge end, and means, here afforded by passage *c*, to conduct air, from a point where the pressure is greater than at said outlet, to within the container and below said level, the latter means having its intake facing out of opposition to the direction of flow through said passage if it is arranged to take air therefrom.

If the cleaner includes a liquid container having a transparent exposed wall portion, as the container 6, such container affords means to indicate to the operator if the nozzle 1 is in proper proximity to the carpet, etc., for effective cleaning. That is to say, in the present example, with the nozzle pressing the carpet against the floor, the nozzle would be so sealed that there would occur little if any agitation of the liquid, indicating that it should be displaced upwardly, as by adjustment, until ebullition of the liquid would be seen through said transparent wall portion.

It is to be understood that my invention is not limited in its application to vacuum cleaners but may be applied in the operation of any apparatus having a passage for flowing air, as in air-conditioning systems.

Having thus fully described my invention, what I claim is:

1. The combination, with an apparatus having a passage for flowing air, which passage is of a substantially constant cross-sectional area from end to end thereof, of an ebullition system including a container containing a body of liquid, an air conductor having its intake open to the exterior of the container and out of catching relation to air flowing through said passage and its discharge outlet discharging to the liquid in the container below the normal level thereof, and a conductor arranged to receive liquid in atomized state produced by discharge of air to said liquid body by the first conductor and having its discharge outlet arranged to discharge to said passage where the pressure therein is less than that opposite to said intake of the air conductor.

2. The combination, with an apparatus having a passage for flowing air, which passage is of a substantially constant cross-sectional area from end to end thereof, of an ebullition system including a container containing a body of liquid, an air conductor having its intake open to said passage and facing out of catching relation to air flowing through said passage and its discharge outlet discharging to the liquid below the normal level thereof in the container, and a conductor arranged to receive liquid in atomized state produced by discharge of air to said liquid body by the first conductor and having its discharge outlet arranged to discharge to said passage where the pressure therein is less than that opposite to said intake of the air conductor.

3. The combination, with an apparatus having a passage for flowing air, which passage is of a substantially constant cross-sectional area from end to end thereof, of an ebullition system including a liquid container, fluid-conducting means having its intake open to the interior of the container above the liquid level therein and its outlet open to, and positioned to be subject to suction induced by flow of air impelled through, said passage toward the discharge end of the latter, and means to conduct air, from a point within said passage where the velocity of such impelled air is less than that adjacent to said outlet, to within the container and below said level, the latter means having its intake facing out of opposition to the direction of flow through said passage.

4. The combination, with an apparatus having a passage for flowing air, which passage is of a substantially constant cross-sectional area from end to end thereof, of an ebullition system including a liquid container, fluid-conducting means having its intake open to the interior of the container above the liquid level therein and its outlet open to, and positioned to be subject to suction induced by flow of air impelled through, said passage toward the discharge end of the latter, and means to conduct air, from a point within said passage where the velocity of such impelled air is less than that adjacent to said outlet, to within the container and below said level, the latter means having its intake facing generally in the direction of flow of the thus impelled air.

JOHN WINTHROP.